United States Patent Office 3,515,709
Patented June 2, 1970

---

3,515,709
PROCESS FOR ELIMINATING POLYMER BUILD-UP ON REACTOR WALLS DURING POLYMERIZATION OF WATER-INSOLUBLE MONOETHYLENICALLY UNSATURATED LIQUID MONOMERS
Alfred R. Nelson, Bay City, and Vernon D. Floria, Midland, Mich., assignors to The Dow Chemical Company, Midland, Mich., a corporation of Delaware
No Drawing. Filed Aug. 2, 1967, Ser. No. 657,778
Int. Cl. C08f *1/11, 1/13, 3/22*
U.S. Cl. 260—92.8
9 Claims

ABSTRACT OF THE DISCLOSURE

This invention relates to a process for essentially eliminating undesirable polymer build-up on the interior walls of the reaction vessel during the polymerization of substantially water-insoluble monoethylenically unsaturated liquid monomer in aqueous dispersion comprising: essentially uniformly contacting such reactor walls, prior to polymerization of the monomer, with certain water-soluble derivatives of amino polycarboxylic acids.

---

Polymerization of water-insoluble monoethylenically unsaturated liquid monomers such as vinyl chloride and the like in aqueous dispersion is well known, e.g. in polymerization in aqueous suspension, the monomer is dispersed in the aqueous medium by means of vigorous agitation in the presence of a protective colloid to prevent the coagulation of the monomer droplets, and in the additional presence of a polymerization initiator which is usually soluble in the monomer. During such polymerization, and particularly in large scale batch or continuous production runs, undesirable polymer build-up is produced upon the interior walls of the reaction vessel. This polymer buildup is due at least in part to the affinity of the substantially water-insoluble polymer for the interior surface of the reaction vessel, particularly wherein such surface has exposed metal areas e.g. wherein the conventionally used glass-lining has become chipped or otherwise contains imperfections therein. Polymer build-up on the interior walls of the reaction vessel has a two-fold disadvantage in the polymerization of the substantially-water-insoluble monomers described herein. In the first instance, the polymer build-up necessitates frequent cleaning of such interior walls with accompanying added labor and material costs and with undesirable interruption of commercial production. Further, adherence of polymer to the reaction vessel walls having exposed metal surfaces thereon with subsequent peeling of such polymer from the wall results in contamination of polymer being prepared, i.e. the introduction of undesirable metal ions resulting in the formation of off-grade product. It is, therefore, the primary object of this invention to provide a means of essentially preventing the build-up of polymer on the interior walls of a reaction vessel during the polymerization of substantially water-insoluble monoethylenically unsaturated liquid monomer in aqueous dispersion.

It has now been found that the foregoing and related objects can be obtained by the simple expedient of contacting the interior walls of the reaction vessel, prior to polymerization of the herein described monomeric material, with an aqueous solution of one or more water-soluble derivatives of certain amino carboxylic acids selected from the group consisting of (1) amino mono- and polycarboxylic acid derivatives represented by the formula:

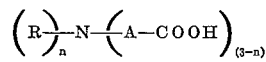

wherein R is hydroxyalkyl, A is an alkylene group of 1 to 3 carbon atoms and $n$ is an integer from 0 to 2, exemplary of which are N,N-di(2-hydroxyethyl) glycine and nitrilo triacetic acid; and (2) polyamino polycarboxylic acids defined by the formula:

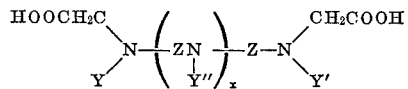

wherein Y and Y' are the same or different and are either hydrogen, —CH$_2$COOH or hydroxyalkyl, Y" is hydrogen or —CH$_2$COOH, Z is an alkylene group of 1 to 4 carbon atoms and $x$ is an integer from 0 to 4.

Of particular value in the present invention are the alkali or alkaline earth metal salts of such compounds and especially the alkali or alkaline earth metal salts of the amino tetra (or higher) acetic acids wherein Y, Y' and Y" are —CH$_2$—COOH, Z is ethylene and $x$ is 0 or 1. Exemplary of such materials are: The compounds of ethylene diamine, N,N'-tetraacetic acid represented by the formula:

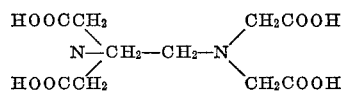

and salts thereof wherein at least two of the hydrogen ions of the acid are replaced by two identical alkali metal ions and the other two hydrogen ions are replaced by ions selected from the class consisting of an alkaline earth metal ion and independently selected alkali metal ions. There are many groups of salts that conform to the above definition. One such group may be represented by salts of the said acid, the hydrogen ions of which are replaced by four mono-valent alkali metal ions. Examples of these salts are the tetra-sodium salt, the tetra-potassium salt, the tetra-lithium salt, the dilithium disodium salt, the diilthium dipotassium salt, and the dipotassium disodium salt. Another such group is represented by salts of the said acid, two hydrogen ions of which are replaced by one divalent alkaline earth metal ion and the other two hydrogen ions by two identical monovalent alkali metal ions. Examples of these salts are the calcium disodium salt, the barium disodium salt, the calcium dilithium salt, the barium dilithium salt, the calcium dipotassium salt, and the barium dipotassium salt and mixtures thereof.

Another type of derivative found to be useful is formed by a substitution for one of the acid radicals of the alkylene diamine tetraacetic acids. The substitution of a hydroxy radical leads to an effective group of compounds, among which N-hydroxyethylethylene diamine triacetic acid-trisodium salt is especially preferred.

The prescribed compounds may be dissolved in aqueous solutions in any desired amount, preferably in amounts comprising from about 0.5 to 5 weight percent of the solution, followed by essentially uniformly contacting the interior surfaces of the reaction vessel with such solution prior to introduction of the polymerization media into the reactor. Alternatively, it has further been found that such compounds may be added to, and dissolved in, the aqueous polymerization media, prior to polymerization of the monomer constituent thereof, in amounts comprising between about 0.01 and 0.1 weight percent based on the amount of water present, and that such compounds unexpectedly preferentially deposit on the interior walls of the reaction vessel during the initial stages of polymerization, thus changing the nature of the wall surface from one which is quite attractive to polymer to one having little or no attraction. Further, utilization of the prescribed types and amounts of the amino polyacetic acid derivatives contemplated by the present invention, do not adversely affect the heat stability or other physical properties of the polymers prepared by such process.

The invention will be more apparent by the following example wherein all parts and percentages are by weight unless otherwise indicated.

EXAMPLE

A series of batch-wise polymerization reactions were conducted by addition of the following materials into a conventional 3500 gallon, glass-lined polymerization vessel equipped with an agitator and jacketed for heating and cooling.

| | Pounds |
|---|---|
| Water | 17,800 |
| Catalyst solution (20% isopropyl percarbonate in in xylene) | 7 |
| Dispersing agent solution (1.74% aqueous solution of a water-soluble hydroxy methyl cellulose ether having a viscosity of about 500 cps.) | 250 |
| Vinyl chloride monomer | 9,000 |
| Calcium disodium salt of ethylene diamine, N,N'-tetraacetic acid | 4 |

Each reaction was conducted at a temperature of about 50° C. for a period of about 9 hours, after which the polymer was filtered and dried. In each of a series of 66 of such individual polymerization reactions, little or no polymer build-up was observed on the interior walls of the reactor. Additionally, each so-formed polymer was characterized by being of uniform particle size and was essentially free of undesirable polymer gels. Similar good results were also observed by flushing the interior of the reaction vessel (prior to addition of the required amounts of water, monomer, catalyst and dispersing agent) with an aqueous solution containing from about 0.5 to 5 percent by weight of water of the calcium disodium salt of ethylene diamine, N,N'-tetraacetic acid. Similar good results were also obtained by substituting N-hydroxyethylethylene diamine triacetic acid-trisodium salt as the derivative of amino polyacetic acid, in the processes as specifically set forth above.

By way of comparison, each of a series of 26 individual polymerization reactions as described herein, but where the derivative of amino polyacetic acid was not used (either as an additive to the monomer charge or as an aqueous flushing solution), were each characterized by excessive polymer build-up on the interior walls of the reactor to the extent that high pressure water washing of such walls was necessary after each polymerization reaction. Further, each of the so-formed polymers contained significant amounts of off-grade materials including coarse polymer particles as well as undesirable polymeric gels.

Although the present invention has been specifically illustrated wtih regard to the suspension polymerization of vinyl chloride polymer and to the use of the calcium disodium salt of ethylene diamine N,N'-tetraacetic acid or N-hydroxyethylethylene diamine triacetic acid-trisodium salt, it is to be understood that any water-soluble derivative of an amino polyacetic acid as described herein may be used. Further, such process may also be advantageously applied in the polymerization in aqueous dispersion of any substantially water-insoluble polymerizable ethylenically unsaturated liquid monomer. Exemplary of such additional monomers are the vinylidene halides such as vinylidene chloride; vinyl alkanoates such as vinyl acetate, vinyl propionate and the like and acrylonitrile and mixtures thereof. It is further to be understood that the process of the present invention is applicable to polymerization of such monomers utilizing conventional water-soluble or water-dispersible granulating and/or wetting agents and coagulants to aid in the formation of polymer particles of desired size and shape.

What is claimed is:

1. A process for essentially eliminating polymer buildup on the interior surfaces of a reaction vessel during the polymerization of substantially water-insoluble monoethylenically unsaturated liquid monomer in aqueous dispersion comprising: essentially uniformly contacting said surfaces prior to polymerzation of said monomer with at least one water-soluble derivative of an amino carboxylic acid selected from the group consisting of (1) amino acids represented by the formula:

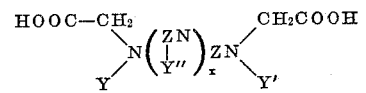

wherein R is hydroxyalkyl, A is an alkylene group of 1 to 3 carbon atoms and $n$ is an integer from 0 to 2; and (2) polyamino acids represented by the formula:

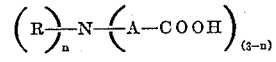

wherein Z is an alkylene group of 1 to 4 carbon atoms, $x$ is an integer from 0 to 4, Y'' is hydrogen or

—CH$_2$COOH and Y and Y' are hydrogen, —CH$_2$COOH or hydroxyalkyl.

2. The process of claim 1 wherein the interior surfaces of the reaction vessel are essentially uniformly contacted with an aqueous solution of the derivative of said amino carboxylic acid prior to introduction of monomer to said vessel.

3. The process of claim 2 wherein said aqueous solution contains from about 0.5 to 5 weight percent of the derivative of said amino carboxylic acid.

4. The process of claim 1 wherein the derivative of said amino carboxylic acid is added to the aqueous dispersion of said monomer prior to polymerization of said monomer.

5. The process of claim 4 wherein the derivative of said amino carboxylic acid is present in amounts of from about 0.01 to 0.1 percent based on the weight of water in said aqueous dispersion.

6. The process of claim 1 wherein said monomer is vinyl chloride.

7. The process of claim 2 wherein the derivative of said amino carboxylic acid is the calcium disodium salt of ethylene diamine N,N'-tetraacetic acid.

8. The process of claim 2 wherein the derivative of said amino carboxylic acid is N-hydroxyethylethylene diamine triacetic acid-trisodium salt.

9. A process for essentially eliminating build-up on the interior surfaces of a reaction vessel during the polymerization of substantially water-insoluble monoethylenically unsaturated liquid monomer in aqueous dispersion comprising: essentially uniformly contacting said surfaces prior to polymerization of said monomer with at least one water-soluble salt of an amino carboxylic acid wherein said acid is selected from the group consisting of (1) amino acids represented by the formula:

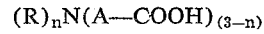

wherein R is hydroxyalkyl, A is an alkylene group of 1 to 3 carbon atoms and $n$ is an integer from 0 to 2; and (2) polyamino acids represented by the formula:

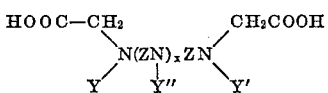

wherein Z is an alkylene group of 1 to 4 carbon atoms, $x$ is an integer from 0 to 4, Y''' is hydrogen or

and Y and Y' are hydrogen, —CH₂COOH or hydroxy- alkyl, and wherein said salts comprise at least the alkali metal ion or alkaline earth metal ion salts of said acids.

References Cited

UNITED STATES PATENTS 3,373,150  3/1968  Pears et al.

JOSEPH L. SCHOFER, Primary Examiner

J. A. DONAHUE, JR., Assistant Examiner

U.S. Cl. X.R.

260—88.7, 89.1, 91.7

Disclaimer 3,515,709.—*Alfred R. Nelson*, Bay City, and *Vernon D. Floria*, Midland, Mich. PROCESS FOR ELIMINATING POLYMER BUILD-UP ON REACTOR WALLS DURING POLYMERIZATION OF WATER-INSOLUBLE MONOETHYLENICALLY UNSATURATED LIQUID MONOMERS. Patent dated June 2, 1970. Disclaimer filed Oct. 5, 1970, by the assignee, *The Dow Chemical Company*.

Hereby enters this disclaimer to claims 1, 4, 5, 6 and 9 of said patent.

[*Official Gazette March 2, 1971.*]